(12) United States Patent  
Okada et al.

(10) Patent No.: US 8,081,354 B2  
(45) Date of Patent: Dec. 20, 2011

(54) STRUCTURE SUPPORTING DISTRIBUTION CABLE OF DOCUMENT READING APPARATUS

(75) Inventors: Tomohiko Okada, Kyoto (JP); Yasuhiro Suto, Nara (JP); Mitsuharu Yoshimoto, Nara (JP); Kenji Tanaka, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 982 days.

(21) Appl. No.: 12/029,556

(22) Filed: Feb. 12, 2008

(65) Prior Publication Data

US 2008/0196937 A1 Aug. 21, 2008

(30) Foreign Application Priority Data

Feb. 20, 2007 (JP) ................................. 2007-039797

(51) Int. Cl.
*H04N 1/04* (2006.01)
*H45K 7/14* (2006.01)

(52) U.S. Cl. ........ 358/474; 358/471; 358/475; 358/497; 358/483; 174/535

(58) Field of Classification Search .................. 358/474, 358/497, 494, 471; 399/212, 211; 174/535
See application file for complete search history.

(56) References Cited

U.S. PATENT DOCUMENTS 6,549,743 B2 4/2003 Takahashi et al.
6,819,896 B2 * 11/2004 Takahashi et al. ............ 399/211
7,618,134 B2 * 11/2009 Kuriki ............................. 347/85

FOREIGN PATENT DOCUMENTS

JP 02-101863 4/1990
JP 2002-218177 8/2002

* cited by examiner

*Primary Examiner* — Cheukfan Lee
(74) *Attorney, Agent, or Firm* — Renner, Otto, Boisselle & Sklar, LLP

(57) ABSTRACT

An embodiment of the present invention involves a document reading apparatus that includes an optical scanning unit that moves back and forth in a document reading direction so as to read information of a document placed on a document placement table arranged in a top face of a frame by irradiating the document with light emitted from a light source lamp, and a distribution cable connected to the light source lamp. The optical scanning unit includes a support member that leads out and supports the distribution cable connected to the light source lamp in the document reading direction, and the support member includes a regulating member that regulates inclination of the lead-out distribution cable with respect to the document reading direction to support the distribution cable so as to be substantially parallel to the document reading direction.

11 Claims, 14 Drawing Sheets

Twisted for 90 degrees

US 8,081,354 B2

STRUCTURE SUPPORTING DISTRIBUTION CABLE OF DOCUMENT READING APPARATUS

BACKGROUND OF THE INVENTION

This application claims priority under 35 U.S.C. §119(a) on Japanese Patent Application No. 2007-039797 filed in Japan on Feb. 20, 2007, the entire contents of which are hereby incorporated by reference.

The present invention relates to a document reading apparatus provided with an optical scanning unit that moves back and forth in a document reading direction so as to read information of a document placed on a document placement table arranged in a top face of a frame by irradiating the document with light emitted from a light source lamp, and a distribution cable connected to the light source lamp, and in particular, to a structure supporting the distribution cable.

As schematically shown in FIG. 14, a conventional document reading apparatus is provided with an optical scanning unit 600 that moves back and forth in a document reading direction (hereinafter also referred to as a "sub-scanning direction") X so as to read information of a document placed on a document placement table arranged in a top face of a frame 500 by irradiating the document with light emitted from a light source lamp 602, and a distribution cable 650 that connects a drive circuit board 510 disposed in a lower portion of the frame 500 and the light source lamp 602. The distribution cable 650 is led out from one end portion in a main-scanning direction Y perpendicular to the sub-scanning direction X of the optical scanning unit 600 (the end portion on the near side in FIG. 14) along the main-scanning direction Y (for example, see JP H2-101863A).

In such a document reading apparatus, as shown partially enlarged in FIG. 15, a support member 610 that supports the distribution cable 650 is provided at a lead-out portion 601 at one end portion of the optical scanning unit 600.

This support member 610 includes a pass-through channel 611 through which the distribution cable 650 led out from the optical scanning unit 600 is passed, with a lead-in opening 612 and a lead-out opening 613 of the pass-through channel 611 being disposed shifted from each other in the main-scanning direction Y. In other words, when viewed from above, the pass-through channel 611 is gently bent in a substantially S shape, and is disposed such that the distribution cable 650 led out from the lead-out portion 601 of the optical scanning unit 600 is slightly pushed inward. This is because in this structure, the distribution cable 650 cannot be led out straight from the lead-out portion 601 for a reason such as dimensional restrictions in design due to downsizing of the document reading apparatus or the like.

In this case, the top portion of the pass-through channel 611 of the support member 610 is open such that the distribution cable 650 can be fitted in easily, for example. For this reason, a pushing plate 614 for preventing uplifting is provided extended in the top portion of the pass-through channel 611 from one of the sides that form the pass-through channel 611, such that the distribution cable 650 fitted in from above is not uplifted from the pass-through channel 611.

With the support member 610 configured as described above, movement of the distribution cable 650 in a lateral direction, that is the main-scanning direction Y, is restricted only at two locations, the lead-in opening 612 and the lead-out direction 613, and the movement in the main-scanning direction Y is not particularly restricted inside the pass-through channel 611. Furthermore, this distribution cable 650 is a parallel duplex cable having a substantially eyeglasses-shaped cross section. The distribution cable 650 is led out from the lead-out portion 601 of the optical scanning unit 600 in a vertical state in which two cores thereof are arranged up and down, is passed through from the lead-in opening 612 of the support member 610 in the vertical state, is twisted so as to be rotated for 90 degrees inside the pass-through channel 610, and then is led out from the lead-out opening 613 in a horizontal state in which the two cores thereof are arranged right and left.

Therefore, under the action of restoring stress that is produced as a result of the distribution cable 650 being supported in substantially an S shape by supporting the distribution cable 650 at two locations, the lead-in opening 612 and the lead-out opening 613, which are disposed shifted from each other in the main-scanning direction Y, and rotational stress to eliminate the twist for 90 degrees inside the pass-through channel 611, the distribution cable 650 led out from the lead-out opening 613 results in being led out to a direction X', which is slightly inclined to the central portion with respect to the sub-scanning direction X, as shown in FIG. 15.

On the other hand, as shown in FIG. 14, in the vicinity of the inner side of the distribution cable 650, a drive wire 520 for moving the optical scanning unit 600 back and forth in the sub-scanning direction X is disposed parallel to the distribution cable 650. Therefore, when the distribution cable 650 is led out obliquely, it is possible that the distribution cable 650 contacts the drive wire 520 due to back and forth movement of the optical scanning unit 600 in the sub-scanning direction X, a leakage current is generated via floating capacitance present between the distribution cable 650 and the drive wire, and consequently the light intensity of the lamp becomes unstable, or in some cases it is possible that the distribution cable 650 is broken as a result of the coating thereof being damaged due to a frictional force produced between the distribution cable 650 and a pulley holding member 671. In addition, it has been also possible that the optical scanning unit 600 does not operate smoothly due to a frictional force produced between the distribution cable 650 and the drive wire 520 so that the read document image becomes blurred.

SUMMARY OF THE INVENTION

The present invention was made in view of the above conventional problems, and it is an object thereof to provide a structure supporting a distribution cable of a document reading apparatus, the structure allowing a distribution cable to be led out parallel to the document reading direction by devising a structure of a support member that supports a portion of the distribution cable immediately after being led out from an optical scanning unit.

In order to address the above problems, the structure supporting a distribution cable of a document reading apparatus of the present invention includes an optical scanning unit that moves back and forth in a document reading direction so as to read information of a document placed on a document placement table arranged in a top face of a frame by irradiating the document with light emitted from a light source lamp; and a distribution cable connected to the light source lamp; wherein the optical scanning unit includes a support member that leads out and supports the distribution cable connected to the light source lamp in the document reading direction, and the support member includes a regulating member that regulates inclination of the lead-out distribution cable with respect to the document reading direction to support the distribution cable so as to be substantially parallel to the document reading direction.

Described more specifically, the support member includes a pass-through channel through which the distribution cable led out from the optical scanning unit is passed, with a lead-in opening and a lead-out opening of the pass-through channel being disposed shifted from each other in a direction perpendicular to the document reading direction, and the regulating member is disposed so as to press the distribution cable against one of the side faces of the pass-through channel. In such a state, a pass-through opening of the distribution cable formed by the one side face of the pass-through channel and the regulating member, and the lead-out opening are disposed parallel to the document reading direction. Furthermore, the one side face of the pass-through channel between the pass-through opening and the lead-out opening is disposed parallel to the document reading direction.

With such an arrangement structure, the distribution cable passed through from the lead-in opening is bent so as to be pressed against one of the side faces of the pass-through channel by the regulating portion. As a result, in such a state, although repulsive stress that attempts to restore this bent state to the original state acts on a bent portion of the distribution cable, since the pass-through opening of the distribution cable formed by the one side face of the pass-through channel and the regulating portion, and the lead-out opening are disposed so as to be parallel to the document reading direction, the distribution cable is supported at these two locations (that is, the pass-through opening and the lead-out opening which are parallel to the document reading direction) and consequently, the repulsive stress is restricted. In addition, one of the side faces between the pass-through opening and the lead-out opening (that is, the side face against which the distribution cable is pressed by the restoring force due to the repulsive stress) is disposed parallel to the document reading direction, and therefore the repulsive stress of the distribution cable is restricted also by the side face. The repulsive stress of the distribution cable is completely restricted in this area as a result of the distribution cable being supported at two locations, the pass-through opening and the lead-out opening which are parallel to the document reading direction, as well as being abutted against the one side face between the pass-through opening and the lead-out opening. Consequently, when the distribution cable is led out from the lead-out opening, it is not affected by the repulsive stress and is led-out straight along the document reading direction. Furthermore, a fastening portion that fastens the distribution cable is provided at the lead-out opening whose top portion is open so that the distribution cable is completely secured at the lead-out opening, and therefore it is possible to lead out the distribution cable straight along the document reading direction in a stable manner.

On the other hand, in the vicinity of the distribution cable led out from the support member, the drive wire is disposed along the document reading direction in order to drive the optical scanning unit. However, as described above, the distribution cable of the present invention is also led out so as to be parallel to the drive wire along the document reading direction. Therefore even if the optical scanning unit moves back and forth in the document reading direction so that the led-out portion of the distribution cable undergoes bending displacement in a sideways U shape, such bending displacement occurs along the document reading direction, which does not cause any unexpected contact by the led-out distribution cable to the drive wire.

In this case, the distribution cable is a parallel duplex cable having a substantially eyeglasses-shaped cross section. Then, the distribution cable led out from the optical scanning unit in a vertical state in which two cores thereof are arranged up and down is passed through from the lead-in opening in the vertical state, is twisted so as to be rotated for 90 degrees after being pressed against the one of the side faces of the pass-through channel by the regulating portion in the vertical state, then is led out from the lead-out opening in a horizontal state in which the two cores thereof are arranged right and left. That is, the distribution cable is twisted for 90 degrees between the pass-through opening and the lead-out opening which are parallel to the document reading direction. Specifically, in terms of the cross section of the distribution cable, the distribution cable is twisted for 90 degrees using as the rotational axis the document reading direction that passes through a substantially central point between the two cores. Therefore, the repulsive force against this rotation (that is, a force to eliminate the twist) does not act in the document reading direction. In other words, although the repulsive force acts on the distribution cable so as to eliminate the twist, the distribution cable led out from the lead-out opening is led out straight in the document reading direction. Moreover, since the fastening portion that fastens the distribution cable is provided in the vicinity of the lead-out opening, the distribution cable is completely secured at the lead-out opening and thereby the repulsive force to the rotation produced due to twisting the distribution cable is also suppressed in this area. Therefore, the distribution cable led out in a horizontal state in which the two cores thereof are arranged right and left is led out straight along the document reading direction in a stable manner without being affected by any stress produced inside the support member that acts on the distribution cable.

Also in this invention, the optical scanning unit includes a first scanning unit from which the distribution cable is led out, and a second scanning unit that guides light reflected on a document from the first scanning unit to an image reading portion, with the second scanning unit including a pulley that supports and guides the distribution cable led out. In addition, a cable guide is disposed on each side of the pulley. By providing a pulley and cable guides to the second scanning unit in this manner, even if the optical scanning unit moves back and forth in the document reading direction so that the led-out portion of the distribution cable undergoes bending displacement in a sideways U shape, effects by such bending displacement are received by the pulley, and such bending displacement occurs in the document reading direction while the movement thereof being restricted by the cable guide, which does not cause any unexpected contact by the led-out distribution cable to the drive wire. Through this, it is possible to cause the distribution cable to undergo bending displacement along the document reading direction more reliably.

With the structure supporting a distribution cable of the present invention, the distribution cable passed through from the lead-in opening of the support member is bent so as to be pressed against one of the side faces of the pass-through channel by the regulating portion. Although repulsive stress that attempts to restore this bent state to the original state acts on a bent portion of the distribution cable, since the pass-through opening of the distribution cable formed by the one of the side faces of the pass-through channel and the regulating portion, and the lead-out opening are disposed so as to be parallel to the document reading direction, the distribution cable is supported at these two locations (that is, the pass-through opening and the lead-out opening which are parallel to the document reading direction) and consequently, the repulsive stress is restricted. In addition, one of the side faces between the pass-through opening and the lead-out opening is disposed parallel to the document reading direction, and therefore the repulsive stress of the distribution cable is restricted also by the side face. The repulsive stress of the distribution cable is completely restricted in this area as a result of the distribution cable being supported at two locations, the pass-through opening and the lead-out opening, which are parallel to the document reading direction, as well as being abutted against the one side face between the pass-through opening and the lead-out opening. Consequently, when the distribution cable is led out from the lead-out opening, it is not affected by the repulsive stress and is led out straight along the document reading direction. As a result, it is possible to prevent occurrence of events in which the distribution cable contacts the drive wire of the optical scanning unit due to back and forth movement of the optical scanning unit in the document reading direction, a leakage current is generated via floating capacitance present between the distribution cable and the drive wire, and consequently the light intensity of the lamp may become unstable, or in some cases the distribution cable may be broken as a result of the coating thereof being damaged due to a frictional force produced between it and a pulley holding member.

DESCRIPTION OF THE PREFERRED EMBODIMENTS

Hereinafter, embodiments of the present invention will be described in detail with reference to the accompanying drawings.

Overall Description of the Document Reading Apparatus

Figure 1:
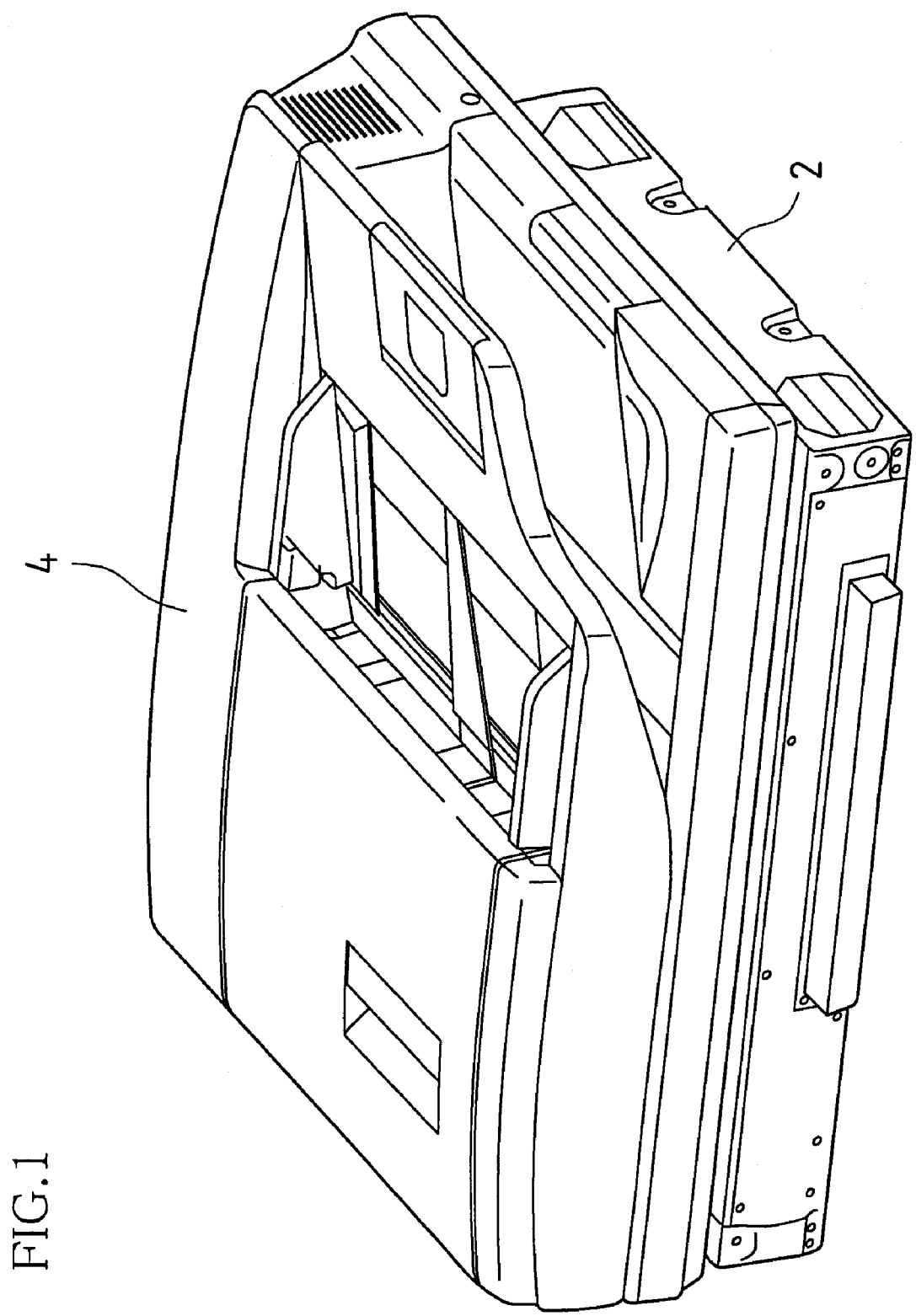
FIG. 1 is a perspective view showing the entire appearance of a document reading apparatus according to the present embodiment.
Figure 2:
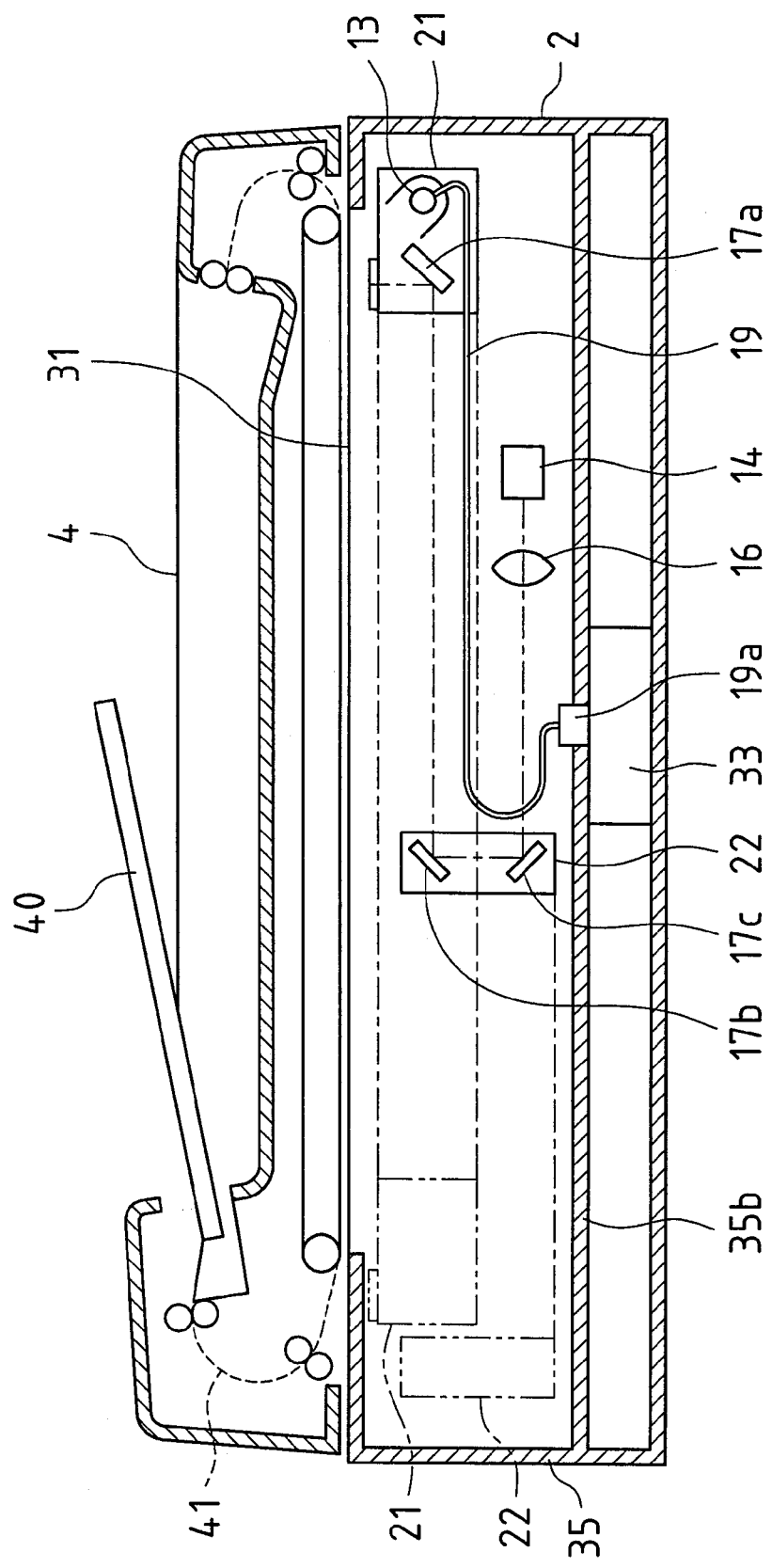
FIG. 2 is a schematic cross-sectional view of the document reading apparatus shown in FIG. 1.

FIG. 1 shows the entire appearance of a document reading apparatus 2 according to the present embodiment. Also, FIG. 2 is a schematic cross-sectional view of the document reading apparatus 2 shown in FIG. 1.

On top of the document reading apparatus 2 of the present embodiment, an automatic document feeder (ADF) 4 is provided that automatically transports a document along a document transport path.

The document reading apparatus 2 includes a document placement table 31 arranged in the top face of a frame 35 that forms an outer frame, a first scanning unit 21, a second scanning unit 22 and an imaging lens 16, image sensing device (CCD) 14, and a drive circuit board 33.

The first scanning unit 21 includes a light source lamp 13, a first mirror 17a and the like. The light source lamp 13 is a low-heat generating lamp serving as a light source portion for irradiating a document with light. The first mirror 17a guides the light reflected from the document to the second scanning unit 22.

The second scanning unit 22 includes a second mirror 17b and a third mirror 17c, which guide the light from the first scanning unit 21 to the image sensing device 14. The imaging lens 16 forms an image on the image sensing device 14 with the light reflected from the document.

The drive circuit board 33 controls lighting of the light source lamp 13, and mounted to the bottom face of a partition plate 35b of the frame 35 of the document reading apparatus 2. A connector (not shown) to which the other terminal portion 19a of a distribution cable 19 is plugged in is provided on the top face of the partition plate 35b.

The ADF 4 functions as a document cover that opens or covers the document placement table 31. The ADF 4 includes a document setting tray 40, a document transport means 41 and a document discharge tray 42. A document whose image information is to be read is placed on the document setting tray 40. The document transport means 41 transports the document placed on the document setting tray 40 onto the document placement table 31, and also discharges the document whose image information has been read to the document discharge tray 42.

Description of the Mechanical Structure of the Document Reading Apparatus

Figure 3:
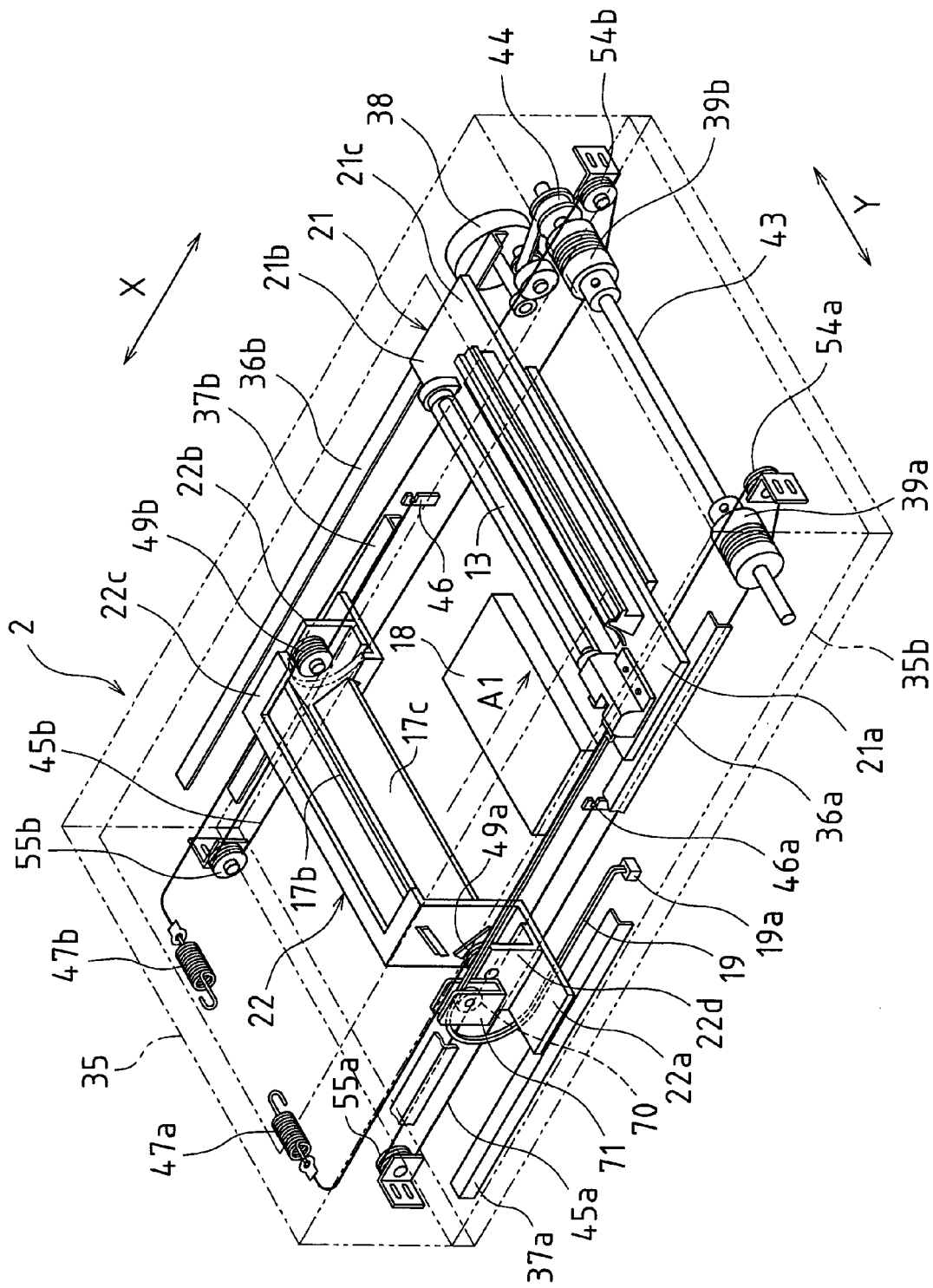
FIG. 3 is a perspective view illustrating a specific structure of a mechanical part of a document reading portion that scans and reads a document.
Figure 4:
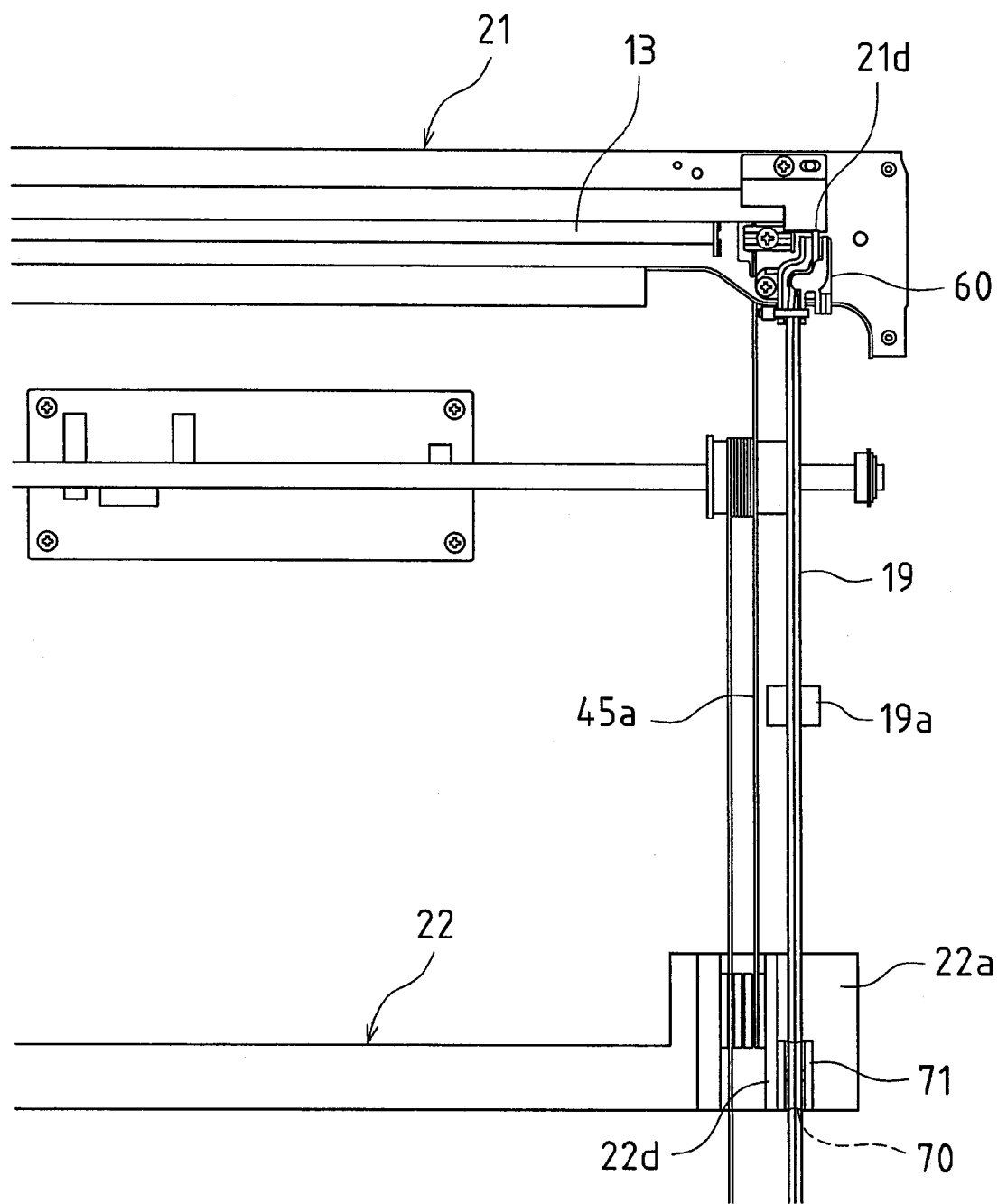
FIG. 4 is an enlarged plan view of one end portion of a first scanning unit.
Figure 5:
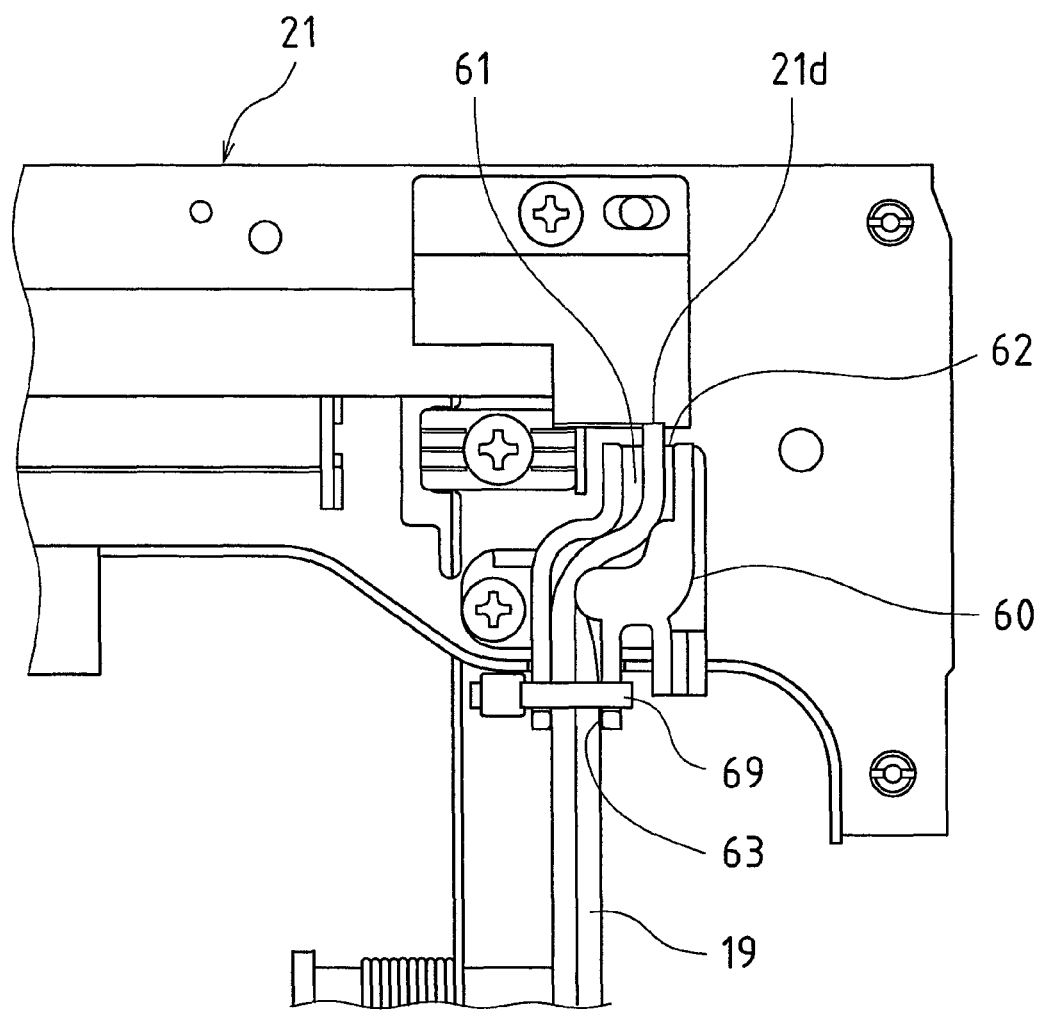
FIG. 5 is a further enlarged plan view of the one end portion of the first scanning unit.
Figure 6:
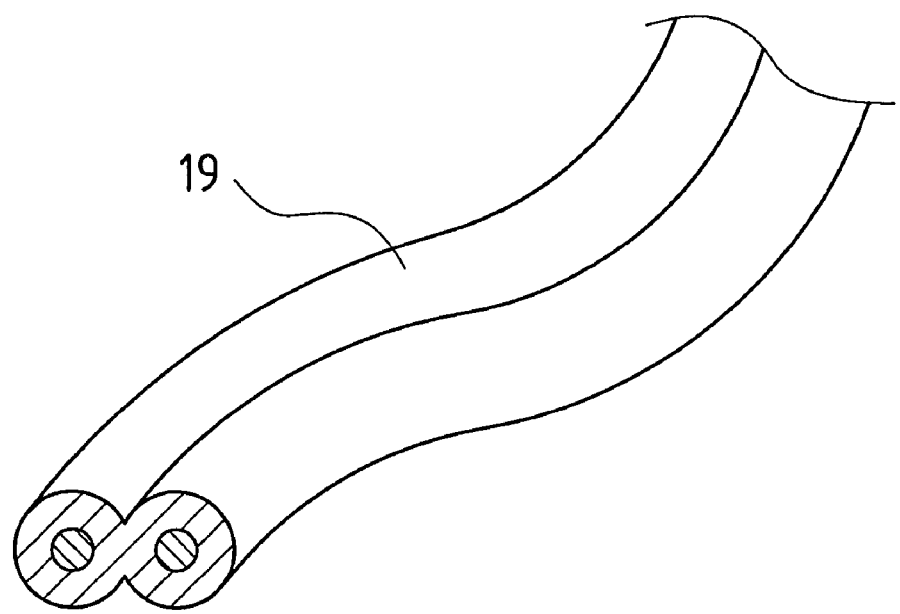
FIG. 6 is a perspective view that shows a distribution cable with a portion thereof cut away.

FIG. 3 is a perspective view illustrating a specific structure of a mechanical part of a document reading portion that scans and reads a document in the document reading apparatus 2 configured as described above. FIGS. 4 and 5 are enlarged plan views of one end portion of the first scanning unit 21, and FIG. 6 is a perspective view that shows the distribution cable 19 with a portion thereof cut away.

As shown in FIGS. 2 and 3, the flat plate partitioning plate 35b is provided at the bottom portion of the frame 35 that forms an outer frame of the document reading apparatus 2. The imaging lens 16 and the image sensing element 14 are mounted in a portion covered by a dark box 18 disposed on the partitioning plate 35b. An arrow A1 indicated by an alternate long and short dash line on the dark box 18 indicates the direction of an optical axis of the imaging lens 16 mounted to the frame 35. For example, sheet steel with zinc plating performed on the surface thereof is used for the frame 35 and the partitioning plate 35b. Furthermore, the first scanning unit 21 and the second scanning unit 22 are mounted so as to be capable of moving back and forth in a direction along the partitioning plate 35b (document reading direction), passing over the dark box 18.

The first scanning unit 21 includes wire fixing portions 21a and 21b in both end portions thereof, and also includes a mirror support portion 21c at the central portion thereof that supports the light source lamp 13 and the first mirror 17a. One of drive wires, 45a, is fixed to one of the wire fixing portions, 21a, and the other drive wire 45b is fixed to the other wire fixing portion 21b. Both end portions of the first scanning unit 21 are supported respectively by guide rails 36a and 36b, and the first scanning unit 21 moves back and forth in the document reading direction (sub-scanning direction) X on the guide rails 36a and 36b. This movement direction X is determined depending on the direction in which the drive wires 45a and 45b fixed at both ends of the first scanning unit 21 are threaded through support pulleys 54a and 55a in both end portions of the first scanning unit 21, which is described later.

The second scanning unit 22 includes wire fixing portions 22a and 22b in both end portions thereof, and also includes a mirror support portion 22c at the central portion thereof that supports the second mirror 17b and the third mirror 17c. The second mirror 17b and the third mirror 17c are so-called intermediate mirrors. A pulley 49a is attached to one of the wire fixing portions, 22a, and the drive wire 45a is threaded through this pulley 49a. A pulley 49b is attached to the other wire fixing portion 22b, and the drive wire 45b is threaded through this pulley 49b. Also, both ends of the second scanning unit 22 are supported respectively by guide rails 37a and 37b, and the second scanning unit 22 moves back and forth in the sub-scanning direction X on these guide rails 37a and 37b. Specifically, the second scanning unit 22 is configured so as to move in a manner linked to the first scanning unit 21, in the same direction as the first scanning unit 21.

A drive motor 38 is a stepping motor that drives the first scanning unit 21 and the second scanning unit 22, the rotation of which is controlled by a motor control circuit (not shown). The rotation of the output shaft of the drive motor 38 is transferred to a drive shaft 43 via a timing belt 44, so as to rotate drive pulleys 39a and 39b attached to both end portions of the drive shaft 43. The drive wires 45a and 45b are respectively wound around the drive pulleys 39a and 39b, and furthermore are fixed to the first scanning unit 21 and the second scanning unit 22. The rotation of the drive pulleys 39a and 39b are transformed to linear motion by the drive wires 45a and 45b, which moves the first scanning unit 21 and the second scanning unit 22 in the sub-scanning direction X. The drive shaft 43 and the drive pulleys 39a and 39b are made of steel, and a steel wire is used for the drive wires 45a and 45b.

Also, at one end portion of the first scanning unit 21 (the end portion on the near side in FIG. 3), the distribution cable 19 is disposed on the outer side from the drive wire 45a. As shown in FIGS. 4 and 5, a lead-out portion 22d of the distribution cable 19 connected to the internal light source lamp 13 is provided at the one end portion of the first scanning unit 21. The distribution cable 19 is led out from this lead-out portion 22d along the sub-scanning direction X, parallel to the drive wire 45a. A support member 60 that supports the led-out distribution cable 19 is provided at the lead-out portion 22d of the first scanning unit 21. This support member 60 includes a pass-through channel 61 that has a lead-in opening 62 and a lead-out opening 63 through which the distribution cable 19 led out from the lead-out portion 22d is passed.

The distribution cable 19 is, as shown in FIG. 6, a parallel duplex cable having a substantially eyeglasses-shaped cross section. Then, the distribution cable 19 led out from the lead-out portion 22d of the first scanning unit 21 in a vertical state in which two cores thereof are arranged up and down, is led in from the lead-in opening 62 of the support member 60 in the vertical state, is twisted so as to be rotated for 90 degrees inside the support member 60, and then is led out from the lead-out opening 63 in a horizontal state in which the two cores thereof are arranged right and left. The leading end side of the distribution cable 19 led out in this manner is bent into a sideways U shape, and a terminal portion 19a at the tip thereof is connected to a connector (not shown) of the drive circuit board 33. In this manner, the distribution cable 19 is disposed having a sufficient amount of slack by bending the distribution cable 19 into a sideways U shape, so that the distribution cable 19 can support (is caused to undergo bending displacement) the movement distance of the first scanning unit 21 without difficulty.

Also, a pulley 70 that catches to guide (hold) a vicinity of the U-shaped bent portion of the led-out distribution cable 19 is provided in the one end portion of the second scanning unit 22 (the end portion on the near side in FIG. 3). In the one end portion of the second scanning unit 22, a pulley holding member 71 formed in a sharp-cornered U shape is fixed to a support plate 22d formed erect along the sub-scanning direction X, with the open portion thereof arranged along the sub-scanning direction X, and the pulley 70 is pivotally supported so as to be capable of freely rotating in a space created inside the pulley holding member 71. Also, both end portions of this pulley holding member 71 are extended upward exceeding the pulley 70, so as to function as a cable guide that restricts the distribution cable 19 caught by the pulley 70 so as not to be displaced in the main scanning direction Y.

Description of Drive Wire Threading Structure

Figure 7A:
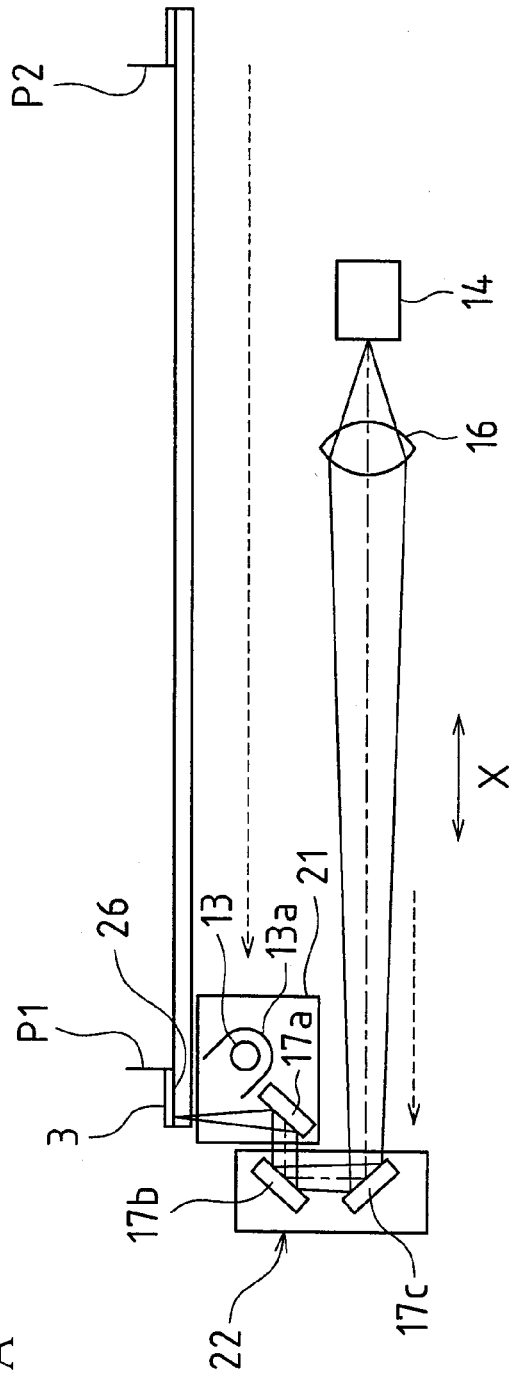
FIGS. 7A and 7B are explanatory diagrams illustrating the positional relationship of constituent members of the optical system shown in FIG. 3.
Figure 7B:
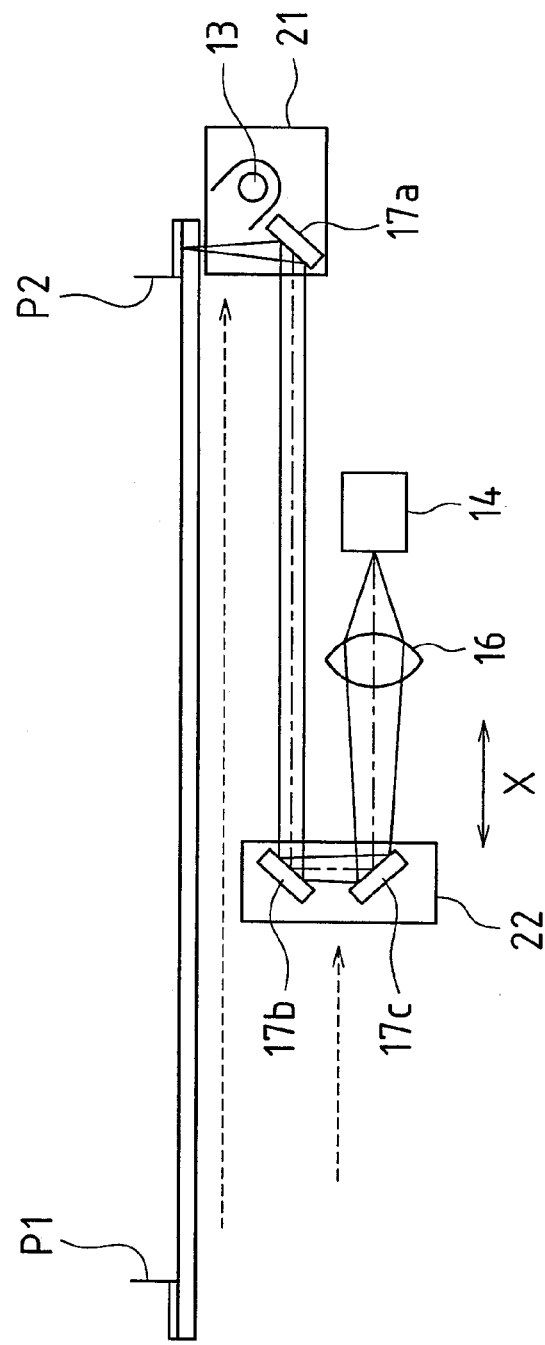
Figure 8:
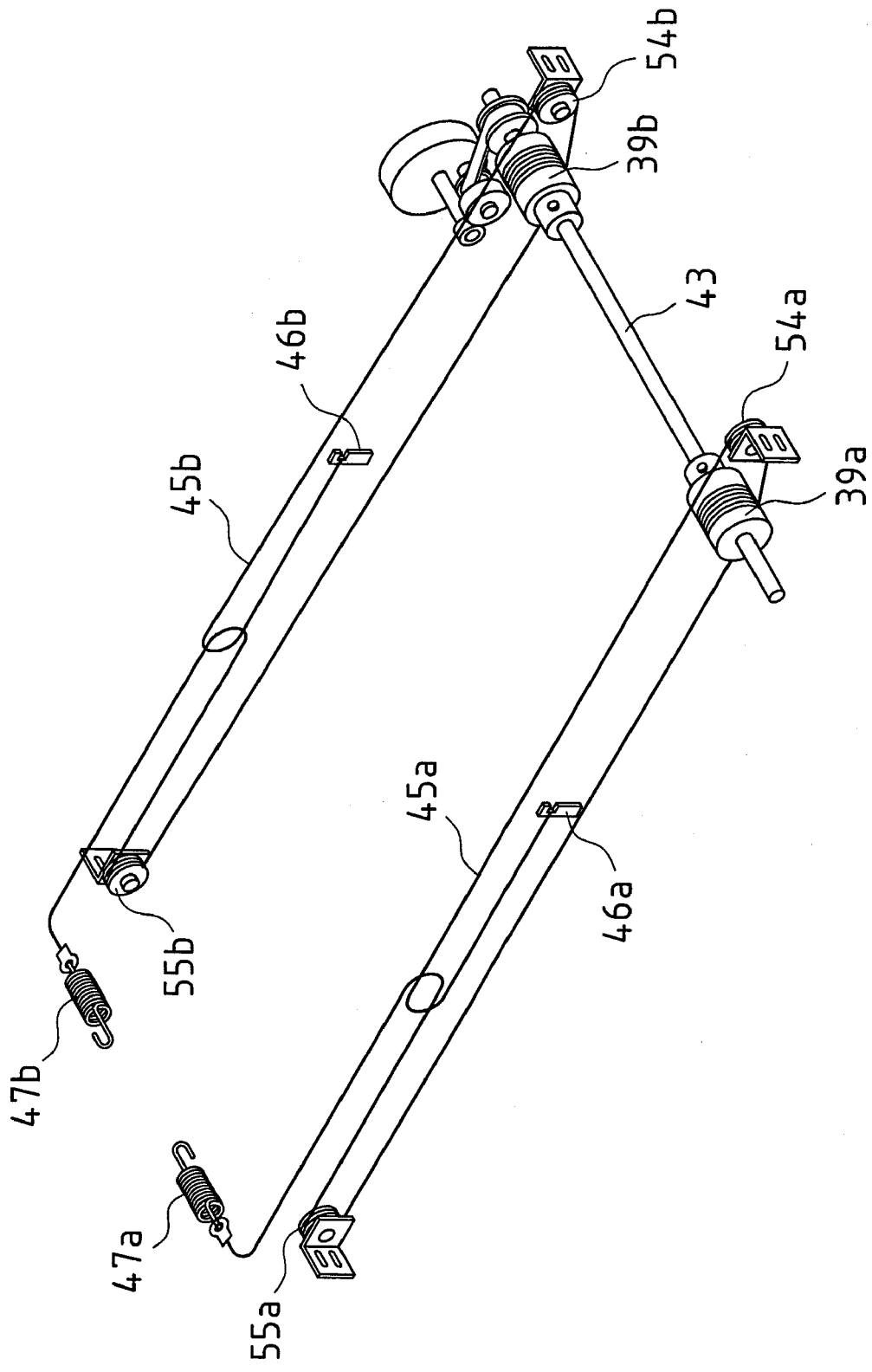
FIG. 8 is a perspective view schematically showing the constituent members of drive wires, support pulleys and drive pulleys only, those being extracted from FIG. 3.

Next, the drive wire threading structure is described with reference to the explanatory diagram illustrating the positional relationship of constituent members of the optical system shown in FIGS. 7A and 7B, and the perspective view of the constituent members shown in FIG. 8. It should be noted that FIG. 8 is a perspective view schematically showing the constituent members of the drive wires 45a and 45b, the support pulleys 54a, 54b, 55a and 55b, and the drive pulleys 39a and 39b only, those being extracted from FIG. 3. With reference to this FIG. 8, routing of the drive wires 45a and 45b can be easily understood. Hereinafter, the threading structure of the drive wires 45a and 45b is described with reference to FIGS. 3, 7 and 8.

One end of the drive wire 45a is fixed to a hook 46a. The other side of the drive wire 45a is extended and threaded through the pulley 49a of the second scanning unit 22, and is further extended to be fixed to the wire fixing portion 21a of the first scanning unit 21 on the scanning end side (P2 side in FIGS. 7A and 7B). Since the pulley 49a moves like a movable pulley, the second scanning unit moves at a speed that is half that of the first scanning unit. The drive wire 45a is further extended from the portion fixed to the first scanning unit 21 to be threaded through the support pulley 54a. The drive wire 45a is further extended and wound around the drive pulley 39a, and then threaded through the support pulley 55a on the scanning start side (P1 side in FIGS. 7A and 7B). Then, the drive wire 45a is further extended and threaded through the pulley 49a of the second scanning unit 22. The end portion of the drive wire 45a is fixed to the frame 35 via a tension spring 47a. At the portion where the drive wire 45a is bent at a substantially right angle just before the tension spring 47a, unshown pulley is provided. This unshown pulley changes the direction of tension of the drive wire 45a into the direction of the tension spring 47a that is threaded through the frame 35.

When the drive pulley 39a rotates clockwise in FIG. 3, the drive wire 45a on the side of the hook 46a is taken up. As a result, the first scanning unit 21 and the second scanning unit 22 moves from the scanning start side (P1 side) to the scanning end side (P2 side) (see FIG. 7B). Along with the rotation of the drive pulley 39a, the drive wire 45a on the side of the tension spring 47a is loosened, but the pulley 49a moves to the scanning end side (P2 side) to stretch the loosened portion in a sideways U shape. When the drive pulley 39a rotates in the opposite direction (counterclockwise), the drive wire 45a on the side of the tension spring 47a is taken up and a sideways U-shaped portion threaded through the pulley 49a is taken up. As a result, the second scanning unit 22 moves from the scanning end side (P2 side) to the scanning start side (P1 side) (see FIG. 7A), thereby moving the first scanning unit 21 as well.

While the above description relates to one of the drive wires, 45a, similarly, one end of the other drive wire 45b is fixed to a hook 46b, and the drive wire 45b is extended via the pulley 49b, the wire fixing portion 22b, the support pulley 54b, the drive pulley 39b, the support pulley 55b and the pulley 49b, and the other end of the drive wire 45b is fixed to the frame 35 via a tension spring 47b.

Description of the Structure of Support Member

In the above configuration, the document reading apparatus 2 of the present embodiment is characterized by the structure of the support member 60 supporting the distribution cable 19 led out from the lead-out portion 22d of the first scanning unit 21.

Figure 9:
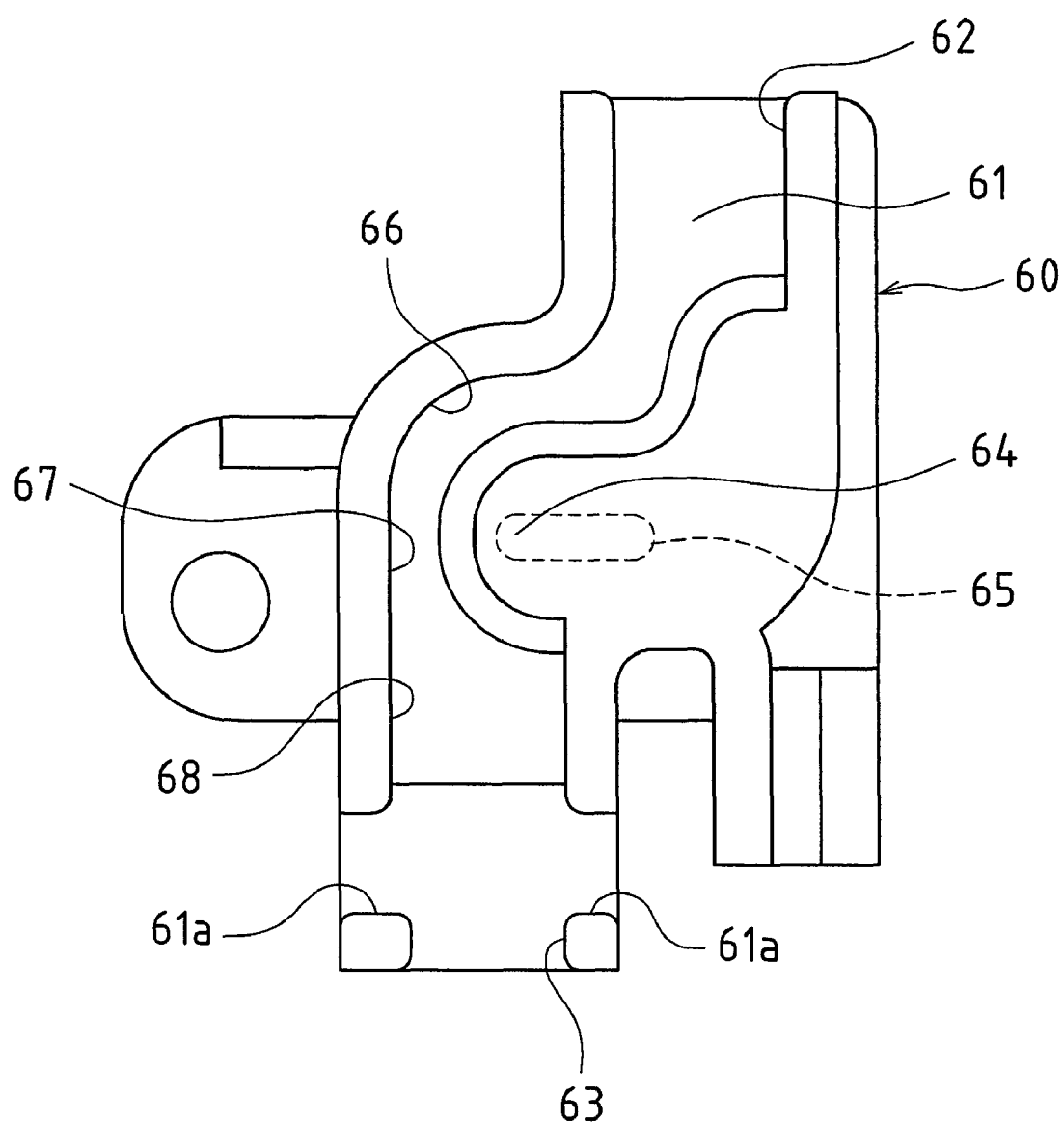
FIG. 9 is a plan view showing a structure of a support member according to the present embodiment.
Figure 10:
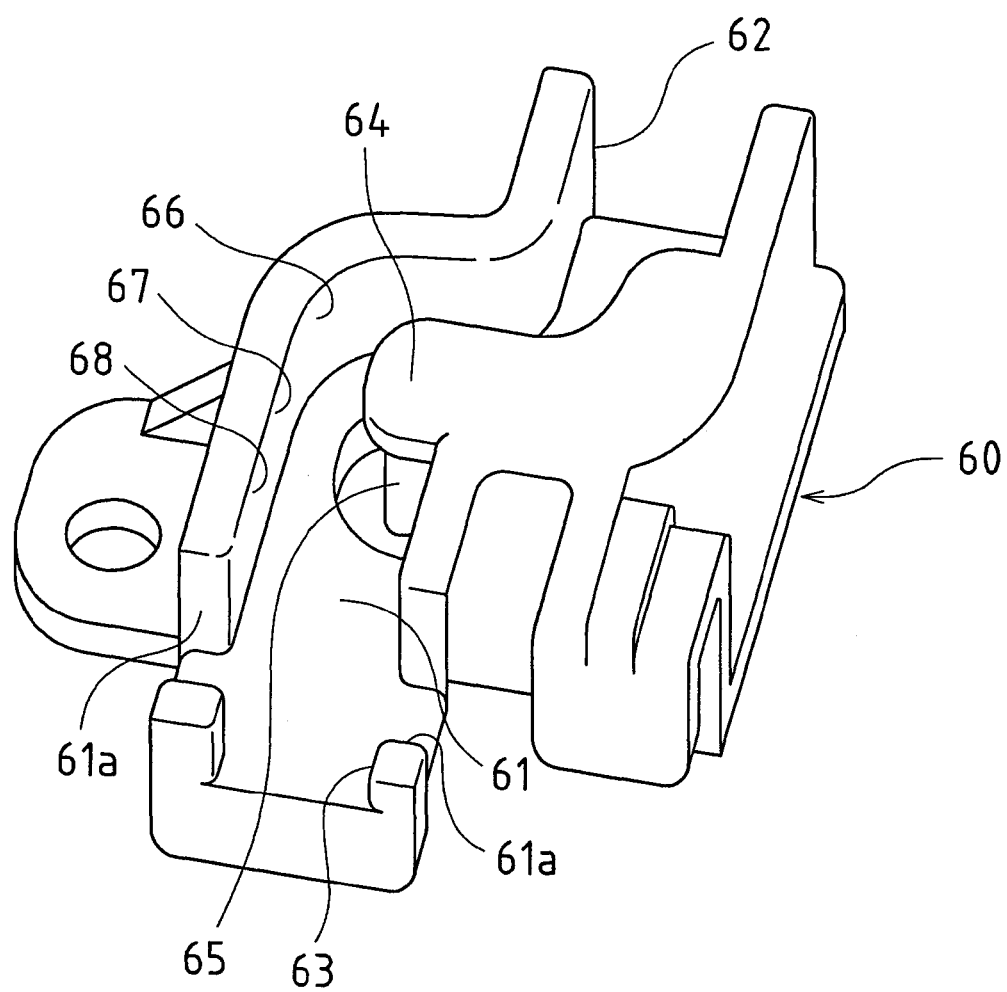
FIG. 10 is a perspective view of the support member according to the present embodiment as viewed from a lead-out side of the distribution cable.
Figure 11:
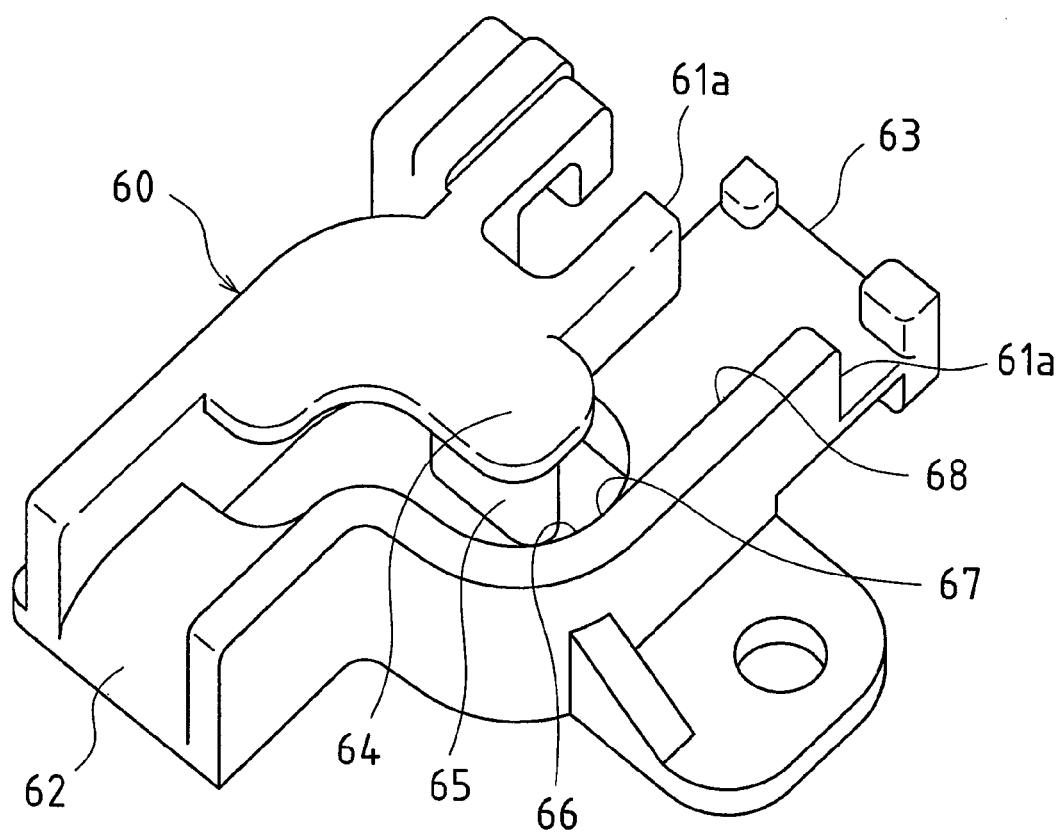
FIG. 11 is a perspective view of the support member according to the present embodiment as viewed from a lead-in side of the distribution cable.
Figure 12:
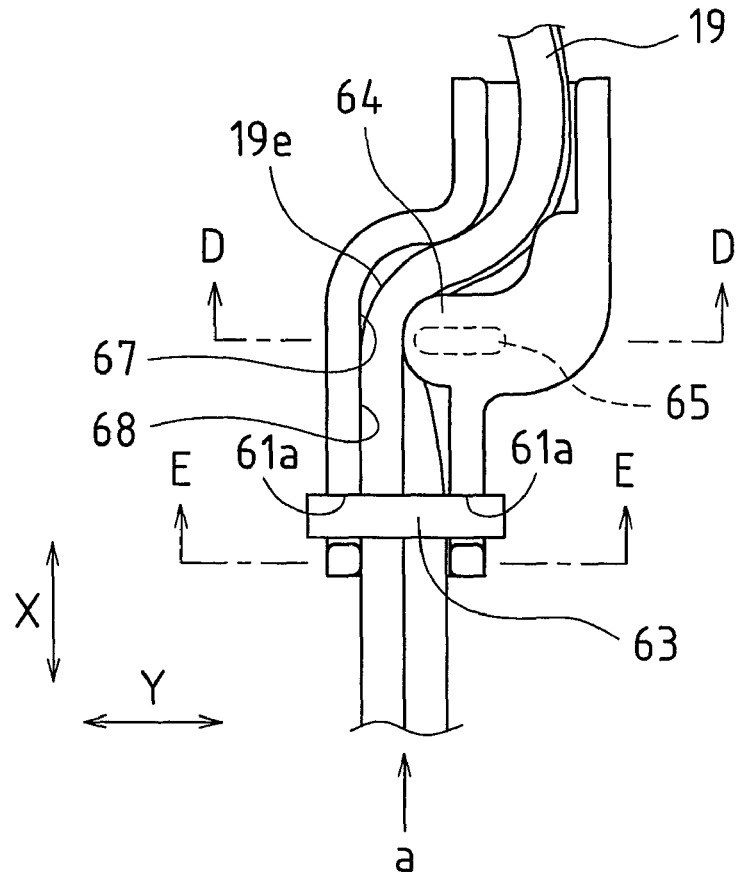
FIG. 12 is a plan view showing a state in which the distribution cable is passed through the support member according to the present embodiment.
Figures 13A, 13B:
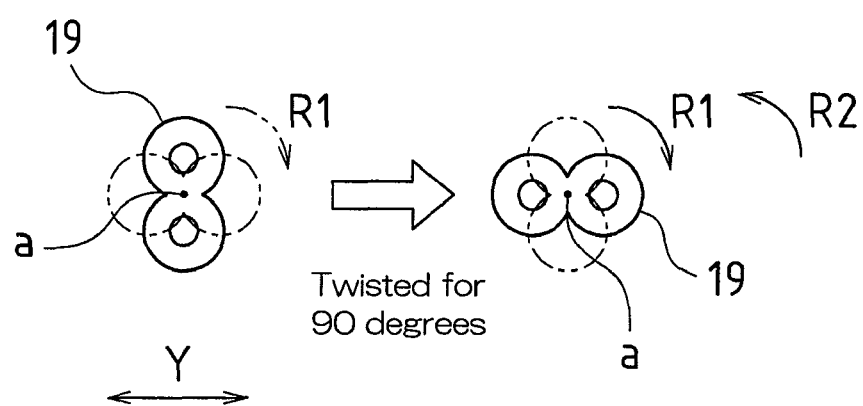
FIG. 13A is a cross-sectional view of the distribution cable along the line D-D in FIG. 12.
FIG. 13B is a cross-sectional view of the distribution cable along the line E-E in FIG. 12.
Figure 14:
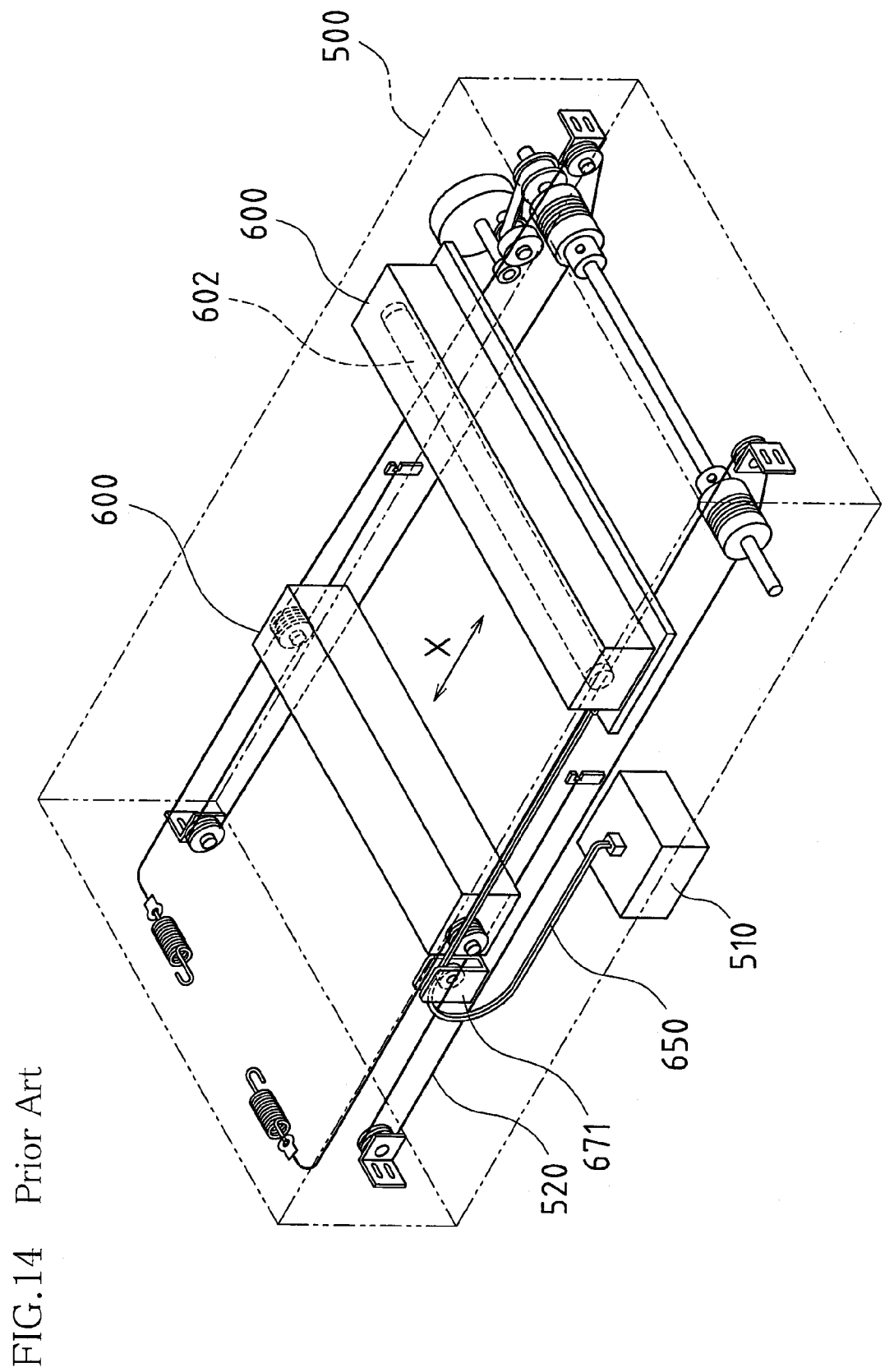
FIG. 14 is a perspective view showing a schematic structure of a mechanical part of a document reading portion of a conventional document reading apparatus.
Figure 15:
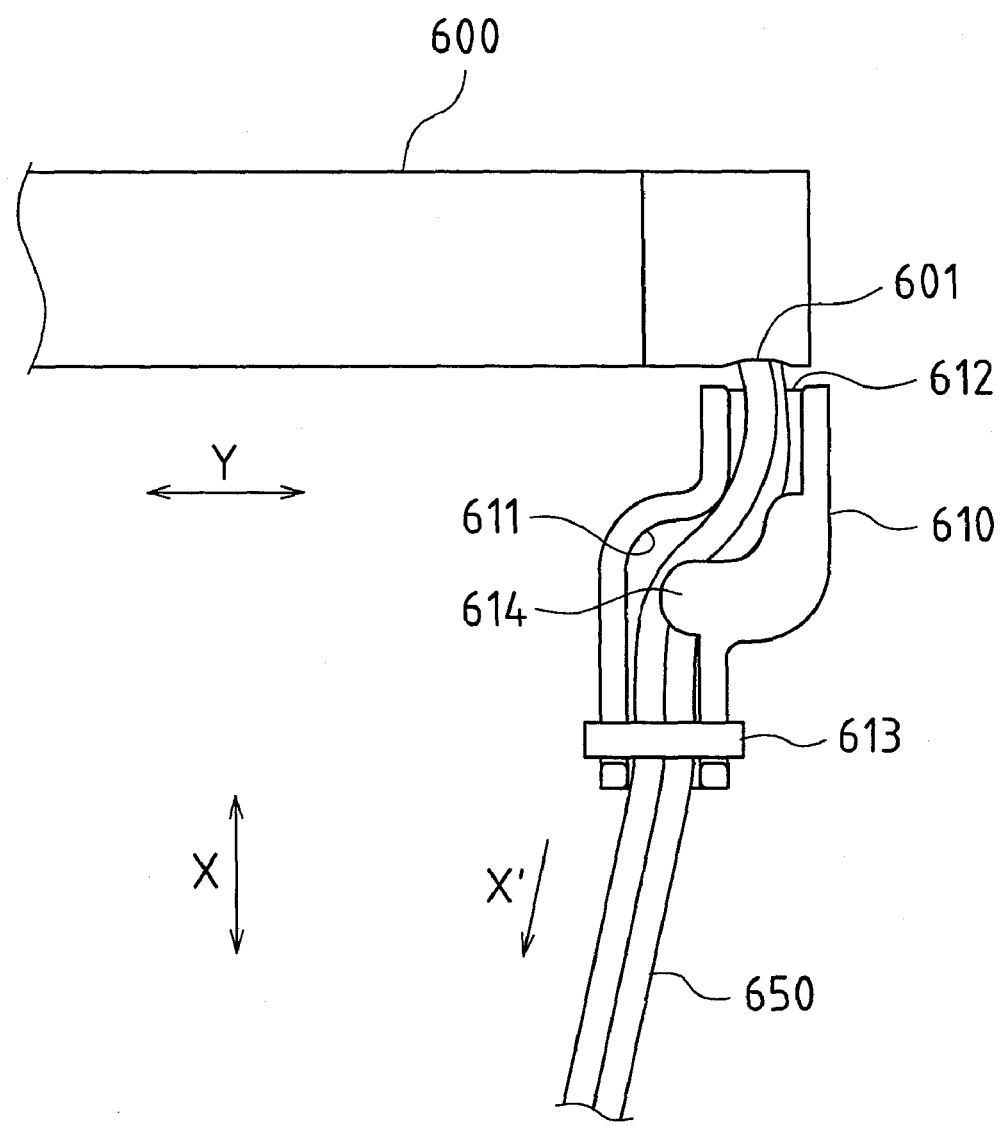
FIG. 15 is an enlarged plan view of one end portion of a first scanning unit of the conventional document reading apparatus.

FIGS. 9 through 13A and 13B illustrate a structure of the support member 60 of the present embodiment. FIG. 9 is a plan view of the support member 60, FIG. 10 is a perspective view thereof as viewed from the lead-out side of the distribution cable 19, and FIG. 11 is a perspective view thereof as viewed from the lead-in side of the distribution cable 19 (that is, from the first scanning unit 21 side). FIG. 12 is a plan view showing a state in which the distribution cable 19 is passed through the support member 60. FIGS. 13A and 13B are cross-sectional views of the distribution cable 19.

As described above, the support member 60 of the present embodiment includes the pass-through channel 61 through which the distribution cable 19 led out from the first scanning unit 21 is passed, with the lead-in opening 62 and the lead-out opening 63 of the pass-through channel 61 being disposed shifted from each other in the main-scanning direction Y, which is perpendicular to the sub-scanning direction X. In other words, when viewed from above, the pass-through channel 61 is gently bent in a substantially S shape and is disposed such that the distribution cable 19 led out from the lead-out portion 22d of the first scanning unit 21 is slightly pushed inward. This is because, as described in the section BACKGROUND OF THE INVENTION, the structure is one in which the distribution cable 19 cannot be led out straight from the lead-out portion 22d, for a reason such as dimensional restrictions in design due to downsizing of the document reading apparatus or the like.

In this case, the top portion of the pass-through channel 61 of the support member 60 is open such that the distribution cable 19 can be fitted in easily, for example. For this reason, a pushing plate 64 for preventing uplifting is provided extended in the top portion of the pass-through channel 61 from one of the sides that form the pass-through channel 61, such that the distribution cable 19 fitted in from above is not uplifted from the pass-through channel 61. Accordingly, in the present embodiment, the configuration is such that a regulating plate (rib piece) 65 is provided below the pushing plate 64, the regulating plate 65 regulating inclination of the distribution cable 19 inside the pass-through channel 61 so as to support the distribution cable 19 substantially parallel to the sub-scanning direction X. Specifically, the regulating plate 65 is provided so as to protrude into the pass-through channel 61 from a lateral side thereof, and is disposed such that the distribution cable 19 is pressed against one side face (left side face in FIG. 9) 66 of the pass-through channel 61. In such a state, a pass-through opening 67 of the distribution cable 19, which is formed by the one side face 66 of the pass-through channel 61 and the regulating plate 65, and the lead-out opening 63 are disposed along the sub-scanning direction X. Furthermore, one of the side faces, 68, that forms the pass-through channel between the pass-through opening 67 and the lead-out opening 63, is disposed parallel to the sub-scanning direction X.

With such an arrangement structure, the distribution cable 19 passed through from the lead-in opening 62 is bent so as to be pressed against one of the side faces, 66, of the pass-through channel 61 by the regulating plate 65 (however, in actuality, a small space may be allowed for since certain room is needed when fitting the distribution cable 19). As a result, in such a state, although repulsive stress that attempts to restore this bent state to the original state acts on a bent portion 19e of the distribution cable 19 (see FIG. 12), since the pass-through opening 67 of the distribution cable formed by the one side face 66 of the pass-through channel 61 and the regulating plate 65, and the lead-out opening 63 are disposed so as to be parallel to the sub-scanning direction X, the distribution cable 19 is supported at these two locations (that is, the pass-through opening 67 and the lead-out opening 63) and consequently, the repulsive stress is restricted. In addition, one of the side faces, 68, between the pass-through opening 67 and the lead-out opening 63 (that is, the side face against which the distribution cable 19 is pressed by the restoring force due to the repulsive stress) is disposed parallel to the sub-scanning direction X, and therefore the repulsive stress of the distribution cable 19 is restricted also by the side face 68. The repulsive stress of the distribution cable 19 is completely restricted as a result of the distribution cable 19 being supported at two locations, the pass-through opening 67 and the lead-out opening 63, which are parallel to the sub-scanning direction X, as well as being abutted against the one of the side faces, 68, between the pass-through opening 67 and the lead-out opening 63. Consequently, when the distribution cable 19 is led out from the lead-out opening 63, it is not affected by the repulsive stress and is led out straight along the sub-scanning direction X. Furthermore, a fastening band 69 that fastens (secures) the distribution cable 19 by pressing the distribution cable 19 from above is provided at the lead-out opening 63 whose top portion is open so that the distribution cable 19 is completely secured at the lead-out opening 63, and therefore it is possible to lead out the distribution cable 19 straight along the sub-scanning direction X in a stable manner.

It should be noted that notch portions 61a and 61a are provided on the right and left side walls in front of the lead-out opening 63, and by wrapping the fastening band 69 around the pass-through channel 61 so as to be fitted into the notch portions 61a and 61a, it is possible to directly press the distribution cable 19 from above to firmly secure the distribution cable 19 on the bottom face of the pass-through channel 61.

In the present embodiment, the distribution cable 19 is, as shown in FIG. 6, a parallel duplex cable having a substantially eyeglasses-shaped cross section. Then, the distribution cable 19 led out from the first scanning unit 21 in a vertical state in which two cores thereof are arranged up and down, is passed through from the lead-in opening 62 in the vertical state, is pressed against the one side face 68 of the pass-through channel 61 by the regulating plate 65 in the vertical state, and is twisted so as to be rotated for 90 degrees and is led out from the lead-out opening 63 in a horizontal state in which the two cores thereof are arranged right and left. That is, the distribution cable 19 is twisted for 90 degrees between the pass-through opening 67 and the lead-out opening 63 which are parallel to the sub-scanning direction X. Specifically, in terms of the cross section of the distribution cable 19, as shown in FIGS. 13A and 13B, the distribution cable 19 is twisted for 90 degrees (rotated in the direction of arrow R1 in FIGS. 13A and 13B) using as the rotational axis the sub-scanning direction X that passes through a point "a", which is a substantially central point between the two cores. Therefore, the repulsive force against this rotation R2 (that is, a force to eliminate the twist) does not act in the main-scanning direction Y, which is perpendicular to the sub-scanning direction X. In other words, although this repulsive force acts on the distribution cable 19 so as to eliminate the twist, the repulsive force does not act in the main-scanning direction Y. Therefore, the distribution cable 19 led out from the lead-out opening 63 is led out straight in the sub-scanning direction X. Moreover, since the fastening band 69 is provided at the lead-out opening 63, the distribution cable 19 is completely secured at the lead-out opening 63 and thereby the repulsive force against the rotation produced due to twisting the distribution cable 19 is also suppressed in this area. Therefore, the distribution cable 19 led out from the lead-out opening 63 in a horizontal state in which the two cores thereof are arranged right and left, is led out straight along the sub-scanning direction X in a stable manner without being affected by any stress produced inside the support member 60 that acts on the distribution cable 19.

In the vicinity of the distribution cable 19 led out from the support member 60 in this manner, the drive wire 45a is disposed parallel thereto in order to drive the first scanning unit 21 and the second scanning unit 22. As described above, the distribution cable 19 is also led out parallel to the drive wire 45a along the sub-scanning direction X. Therefore, even if the first scanning unit 21 and the second scanning unit 22 move back and forth in the sub-scanning direction X so that the led-out portion of the distribution cable 19 undergoes bending displacement in a sideways U shape, such bending displacement occurs along the sub-scanning direction X, which does not cause any unexpected contact by the led-out distribution cable 19 to the drive wire 45a.

In addition, in the present embodiment, as described above, the pulley 70 that catches to support and guide the led-out distribution cable 19 is provided in the second scanning unit 22, and the pulley holding member 71 that pivotally supports the pulley 70 functions as a cable guide. Therefore even if the first scanning unit 21 and the second scanning unit 22 move back and forth in the sub-scanning direction X so that the led-out portion of the distribution cable 19 undergoes bending displacement in a sideways U shape, effects by such bending displacement are received by the pulley 70, and such bending displacement occurs while the movement of the distribution cable 19 in the main-scanning direction Y is being restricted by the cable guide, which does not cause any unexpected contact by the led-out distribution cable 19 to the drive wire 45a. Through this, it is possible to cause the distribution cable 19 to undergo bending displacement along the sub-scanning direction X more reliably.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A structure supporting a distribution cable of a document reading apparatus, the document reading apparatus comprising:
   an optical scanning unit that moves back and forth in a document reading direction so as to read information of a document placed on a document placement table arranged in a top face of a frame by irradiating the document with light emitted from a light source lamp; and
   a distribution cable connected to the light source lamp;
   wherein the optical scanning unit comprises a support member that leads out and supports the distribution cable connected to the light source lamp in the document reading direction, and
   the support member comprises a regulating member that regulates inclination of the lead-out distribution cable with respect to the document reading direction to support the distribution cable so as to be substantially parallel to the document reading direction.

2. The structure supporting a distribution cable of a document reading apparatus according to claim 1,
   wherein the support member comprises a pass-through channel through which the distribution cable led out from the optical scanning unit is passed, with a lead-in opening and a lead-out opening of the pass-through channel being disposed shifted from each other in a direction perpendicular to the document reading direction, and
   the regulating member is disposed so as to press the distribution cable against one of the side faces of the pass-through channel.

3. The structure supporting a distribution cable of a document reading apparatus according to claim 2, wherein a pass-through opening of the distribution cable formed by the one side face of the pass-through channel and the regulating member, and the lead-out opening are disposed parallel to the document reading direction.

4. The structure supporting a distribution cable of a document reading apparatus according to claim 3, wherein the one side face of the pass-through channel between the pass-through opening and the lead-out opening is disposed parallel to the document reading direction.

5. The structure supporting a distribution cable of a document reading apparatus according to claim 4, wherein a fastening portion that fastens the distribution cable is provided in the vicinity of the lead-out opening.

6. The structure supporting a distribution cable of a document reading apparatus according to claim 5,
   wherein the distribution cable is a parallel duplex cable having a substantially eyeglasses-shaped cross section, and
   the distribution cable led out from the optical scanning unit in a vertical state in which two cores thereof are arranged up and down, is passed through the pass-through channel from the lead-in opening in the vertical state, is twisted so as to be rotated for 90 degrees after being pressed against the one of the side faces of the pass-through channel by the regulating portion in the vertical state, and is led out from the lead-out opening in a horizontal state in which the two cores thereof are arranged right and left.

7. The structure supporting a distribution cable of a document reading apparatus according to claim 1, wherein the distribution cable led out from the support member is disposed so as to be parallel to a drive wire disposed in order to drive the optical scanning unit along the document reading direction.

8. The structure supporting a distribution cable of a document reading apparatus according to claim 7, wherein the optical scanning unit comprises a first scanning unit from which the distribution cable is led out, and a second scanning unit that guides light reflected on a document from the first scanning unit to an image reading portion, with the second scanning unit comprising a pulley that supports and guides the distribution cable led out.

9. The structure supporting a distribution cable of a document reading apparatus according to claim 8, wherein a cable guide is disposed on each side of the pulley.

10. The structure supporting a distribution cable of a document reading apparatus according to claim 1, wherein the optical scanning unit comprises a first scanning unit from which the distribution cable is led out, and a second scanning unit that guides light reflected on a document from the first scanning unit to an image reading portion, with the second scanning unit comprising a pulley that supports and guides the distribution cable led out.

11. The structure supporting a distribution cable of a document reading apparatus according to claim 10, wherein a cable guide is disposed on each side of the pulley.

* * * * *